United States Patent [19]

Katz et al.

[11] 4,186,058
[45] * Jan. 29, 1980

[54] METHOD AND APPARATUS FOR HIGH VOLUME DISTILLATION OF LIQUIDS

[76] Inventors: Jerome Katz; Sidney J. Fogel, both of Rochester, N.Y.

[*] Notice: The portion of the term of this patent subsequent to Jul. 12, 1994, has been disclaimed.

[21] Appl. No.: 787,832

[22] Filed: Apr. 18, 1977

Related U.S. Application Data

[63] Continuation-in-part of Ser. No. 681,290, Apr. 28, 1976, Pat. No. 4,035,243, and Ser. No. 769,291, Feb. 22, 1977.

[51] Int. Cl.² .................. C02B 1/04; B01D 1/28
[52] U.S. Cl. .................................... 203/11; 203/26; 203/DIG. 14; 203/100; 203/DIG. 16; 203/DIG. 20; 202/180; 202/182; 202/205; 60/39.57; 60/39.58; 60/648; 60/649
[58] Field of Search ............... 203/11, 10, 24, 26, 203/92, 96, DIG. 16, 49, DIG. 17, DIG. 20, DIG. 8, 100, DIG. 14; 202/234, 235, 182, 205, 180, 176, 177; 60/648, 39.57, 39.58 649

[56] References Cited

U.S. PATENT DOCUMENTS

| | | | |
|---|---|---|---|
| 1,461,640 | 7/1923 | Wirth-Frey | 203/26 |
| 3,423,293 | 1/1969 | Holden | 203/26 |
| 3,607,663 | 9/1971 | Vandenberg | 203/26 |
| 3,879,266 | 4/1975 | Sorensen | 203/26 |
| 4,035,243 | 7/1977 | Katz et al. | 203/26 |

Primary Examiner—Wilbur L. Bascomb, Jr.
Attorney, Agent, or Firm—Sixbey, Friedman & Leedom

[57] ABSTRACT

A method and closed system for high volume distillation of impure liquids comprises evaporating the impure liquid in an evaporator to form a vapor at a temperature above the freezing point and below the critical point, preferably the boiling point, of the liquid at ambient pressure and at a pressure not exceeding a pressure corresponding to the evaporation temperature under saturated conditions; compressing the vapor in compression means which preferably has a compression ratio variable in the range 1.2:1 to 250:1; operating the compression means by direct drive from a mechanical energy source or, preferably, by drivingly linking the compresion means to an auxiliary turbine and causing a gas flow, for example by combusting fuel, through the auxiliary turbine to motivate the auxiliary turbine and, through the drive link, to drive the compression means; cooling the vapor in a condenser means disposed in heat transfer relation with the impure liquid whereby the vapor at least partially condenses, transferring heat to the impure liquid for evaporating at least a portion thereof; and collecting the condensed vapor. The system may also include a coaxial expansion engine means shaft linked to the compression means to receive compressed vapor from the compression means and to produce shaft energy for driving the compression means as the vapor expands therethrough.

45 Claims, 4 Drawing Figures

METHOD AND APPARATUS FOR HIGH VOLUME DISTILLATION OF LIQUIDS

This application is a continuation-in-part of copending application Ser. No. 681,290, filed Apr. 28, 1976, now U.S. Pat. No. 4,035,243, and of copending application Ser. No. 769,291, filed Feb. 22, 1977.

The present invention relates to a method and apparatus for economically and efficiently purifying and recovering high quality water from waste water and, more particularly, to a method and apparatus which permits evaporation and vapor compression treatment of large volumes of impure water.

The need for very large volumes of high quality water arises in many contexts. Many industries require large quantities of good quality water as input or raw material in order to operate. For example, the paper or textile industries utilize tremendous volumes of such water for their dyeing and bleaching operations. Many more industries discharge large quantities of waste or contaminated aqueous solutions to the environment. However, with the continuing decline in quality of the water in our lakes, rivers and streams and the continuing promulgation by federal, state and local governments of statutes and ordinances regulating the quality of water dumped into waterways, there is an increasing need for economical methods by which industrial waste streams can be cleaned prior to discharge. Still another area which requires the treatment of large volumes of water in an efficient and economical fashion is the production of potable water from the oceans by desalination. A related area for treatment of large volumes of water is the treatment of sea water into which oil has been spilled to recover the oil and to desalinate or purify the water. Thus, the problem of waste water treatment in high volumes includes the treatment of impure water as well as sea or brackish water. It also includes the treatment of water containing inorganic or organic impurities or materials where it is desired to separate and recover the water and/or to separate and recover the materials. In a broader sense the problem is not limited to water or aqueous solutions but extends to non-aqueous solutions as well where the components can be substantially separated by the method of distillation. Therefore, all possible feed solutions for separation of the solvent from other constituents of the solution, whether the solvent is aqueous or not, are encompassed within the term "impure liquid" as used herein.

There have been endless suggestions for treating industrial waste and sea water, including multistage distillation plants, thermo-mechanical distillation systems, and the like. However, any system heretofore suggested which has been capable of treating the millions of gallons per day necessary to effectively deal with industrial waste or to produce meaningful quantities of potable water have been hopelessly impractical or uneconomical in terms of their capital equipment or energy requirements. A good illustration of this is the system disclosed in U.S. Pat. No. 3,423,293 to Holden, which is a thermo-mechanical system for distilling impure waste at one atmosphere. The Holden system includes, sequentially, a boiler for evaporation of the water, a compressor, heat exchange means for adding heat to the compressed vapor, a turbine motor for driving the compressor and a condenser unit for extracting the heat of vaporization from the vapor and for transferring this extracted heat to the impure feed liquid at one atmosphere. Although Holden makes a seemingly appealing case for the economics of his system, when practical thermodynamic considerations are imposed it becomes apparent that in order to treat large volumes of water in the Holden system, e.g., 1,000,000 gal/day or 125,000 gal/hr, would require about 1,250,000 ft$^2$ of condenser heat transfer area. Using commercially available condensers, this means that a typical 20 inch wide condenser would have to be 18,266 feet long. If the condenser size were increased to 5 feet wide, a condenser length of 2,031 running feet would be required. The capital costs involved in building a support structure for such a condenser unit are too impractical to consider. Other U.S. patents which teach or disclose water distillation systems and which may be of some interest in connection with the present invention are the following: Nos. 1,230,417; 1,594,957; 2,280,093; 2,515,013; 2,537,259; 2,589,406; 2,637,684; 3,412,558; 3,423,293; 3,425,914; 3,351,537; 3,440,147; 3,444,049; 3,476,654; 3,477,918; 3,505,171; 3,597,328; 3,477,918; 3,505,171; 3,597,328; 3,607,553; 3,649,469; 3,856,631; 3,879,266.

Vapor compression systems are well known for the treatment of impure liquids. However, the system configurations heretofore known have suffered from serious disadvantages which have limited their usefulness. For example, vapor compression systems are typically designed to accept and treat a particular liquid, e.g., salt water, entering the system within a narrow range of initial conditions. As a result, the system is incapable of being used for other liquids or for other initial conditions, and, therefore, its usefulness is limited. In addition, conventional vapor compression systems must operate at low compression ratios, e.g. 1.2:1 to 1.5:1, to minimize cost. This means that the temperature in the evaporator must be close to 212° F. because such low compression ratios prevent drawing any substantial vacuum in the evaporator. Moreover, since the specific volume of water vapor decreases rapidly as temperatures drop below 212° F. and in view of the low compression ratios which must be used, if the vapor pressure exiting the compressor is to be high so that the vapor temperature may be high, the evaporator must operate at or near 212° F. This effective temperature limitation considerably reduces the usefulness of the conventional vapor compression system by limiting the types of liquids which may be treated, by restricting the liquids treated to a low solids content, and by precluding the distillation separation of liquids, such as oil and water, which is most easily accomplished at low temperature.

It is therefore an object of the present invention to provide an economical yet extremely flexible vapor compression system, which is capable of high volume purification of impure liquid sources.

It is another object of the invention to provide a vapor compression system capable of accepting as input a diverse selection of impure liquids over a broad range of influent liquid temperature and pressure conditions.

It is still another object of the invention to provide a vapor compression system which can be rapidly adapted to treat a diversity of impure liquids and which can utilize as an energy source available clean or dirty gases, or most fuels, e.g., natural gas, jet fuel, methane, coal, garbage, etc., to generate such gases.

Other objects and advantages will become apparent from the following description and appended claims.

Briefly stated, in accordance with the aforesaid objects the present invention comprises a method, and a system for practicing the method, for purifying large or small volumes of impure liquid by evaporating the liquid in a boiler under a pressure not exceeding the saturated liquid vapor pressure, substantially adiabatically compressing the resulting vapor to a pressure substantially in excess of the vaporization pressure in a compressor capable of producing a variable compression ratio, and passing the resulting vapor through a condenser, such as the condenser side of the boiler, wherein the vapor will, upon condensing give up thermal energy to vaporize the feed liquid. In an optional form of the invention, the compressed vapor is directed through and substantially adiabatically expands in a turbine before passing to the condenser. The compressor is preferably driven by linking it to the shaft of an auxiliary turbine which may itself be driven by passing a volume of hot gas, e.g., combustion gas, steam, etc., therethrough. In one embodiment, the auxiliary turbine blading is annularly disposed with respect to the compressed vapor flow path and is driven by combustion gases produced in the annular space. Alternatively, the compressor may derive at least a portion of its power from motor means shaft linked directly thereto. The system of the present invention, because its operation is independent of the method of evaporation, e.g., vacuum or flash distillation are both suitable, is extremely flexible in terms of its utility and physical location. In the most common usage, the impure liquid is impure water and the system is able to furnish large quantities of purified water and, under some conditions, useful thermal energy as well.

The invention will be better understood from the following description considered together with the accompanying drawings, wherein like numerals designate like components, in which.

The invention will be better understood and appreciated from a consideration of one embodiment thereof which, for purposes of descriptive clarity, includes only a single-effect evaporative unit. It is of course appreciated, as is well known in the art, that multi-effect evaporative systems have many efficiencies which recommend them in practical usage. The present invention contemplates the use of multi-as well as single-effect evaporative units. In addition, the invention contemplates both vacuum and flash evaporation as well as any other known evaporative techniques for producing high volumes of vapor at $P_1$, $T_1$, as will more clearly appear hereinafter. It is, however, preferred to use vacuum evaporation or vacuum distillation in most instances due to the greater flexibility it affords in terms of plant location. Exemplary multi-effect distillation systems useful in connection with the present invention are illustrated in applicant's copending parent application Ser. No. 681,290, filed Apr. 28, 1976, now U.S. Pat. No. 4,035,243.

Figure 1:
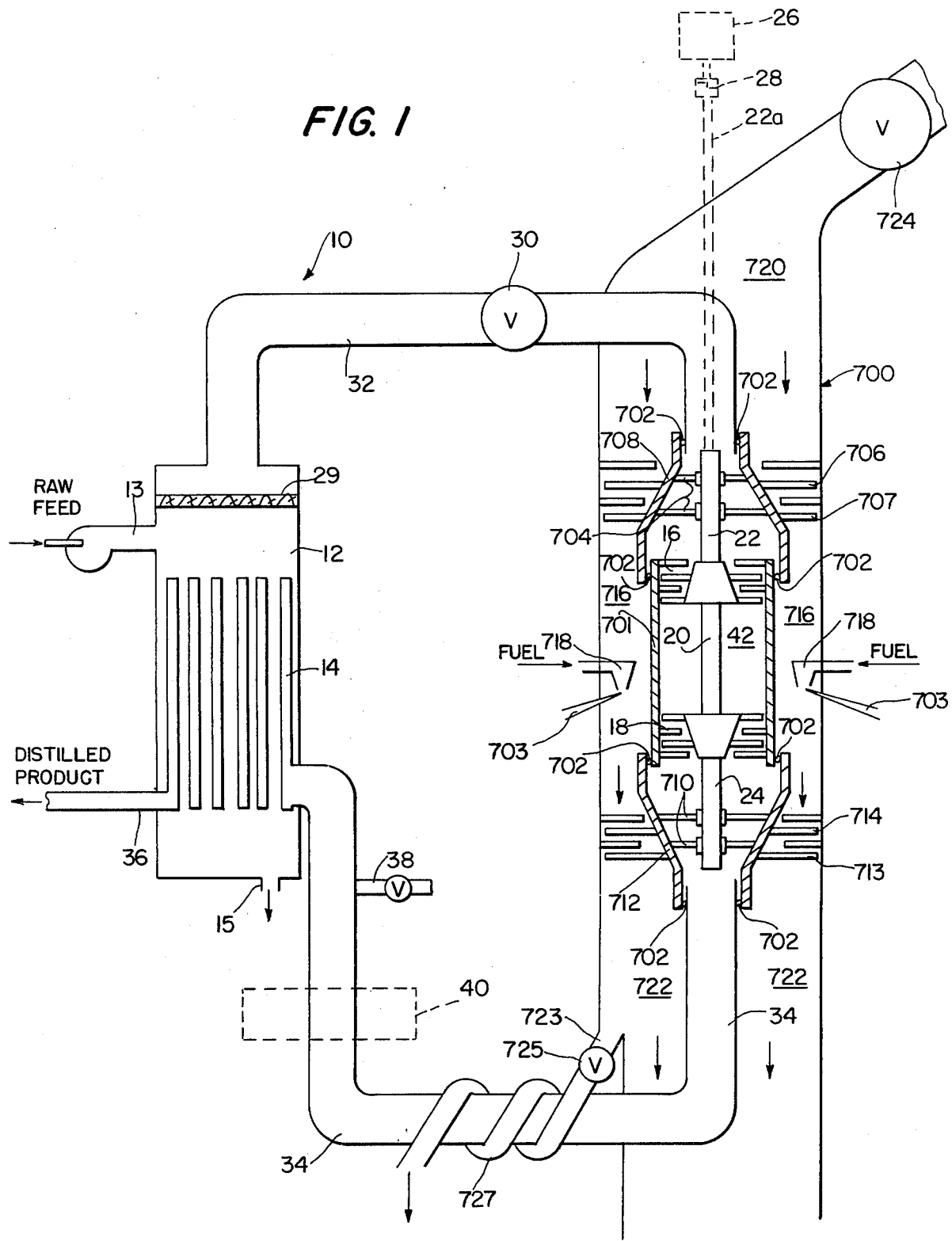
FIG. 1 illustrates schematically a single stage embodiment of the purification system of the present invention in which the vapor treatment section of the system includes an in-line turbine as well as a variable ratio compressor and an auxiliary turbine configured to be operated by combustion gases produced by in situ combustion of fuel and air.

Referring now to FIG. 1, a vacuum distillation-vapor compression system is shown generally at 10. The system consists in its essential aspects of a boiler unit 12 including a condenser section 14 therein, a variable compression ratio turbine compressor 16 operated through shaft 20 and linked by the shaft to turbine motor 18, and means 700 for supplying energy to operate compressor 16, i.e., energy not furnished by turbine 18. The energy supplying means may be hot clean or dirty gases, e.g. combustion gases, passing through the blading of an auxiliary turbine. In lieu of hot gases, or in addition thereto, the compressor 16 can be directly driven through shaft extension 22 by motor means 26, such as an electric or diesel powered motor, acting through motor shaft 22a and clutch and gear box 28 (shown in phantom). It will be appreciated, therefore, that the language "adding energy to the compressor" or similar expressions used herein are intended to contemplate any addition of energy, whether directly or indirectly to the compressor, where the effect of that energy is to operate or power the compressor.

To understand the operation of the system 10, the path of raw feed, e.g., impure water, therethrough can be charted. Initially, a starter motor, such as motor 26, is energized to rotate shafts 20, 22 and 24 through clutch and gear box 28 and motor shaft 22a. Compressor 16 and turbine 18, which are linked to shaft 20, also rotate when the motor 26 is operated. During start-up, the compressor 16 is allowed to rotate for a time sufficient for a vacuum to be drawn on the evaporative side of boiler 12. The extent of the vacuum is predetermined, as will be seen hereinafter, based upon the desired operating parameters of the system and the temperature of the influent impure water and is controlled and monitored by variable pressure valve 30 in duct 32 joining the boiler 12 and compressor 16.

Referring to FIG. 1, which is described using fuel combustion for producing hot gases as the means for driving an auxiliary turbine for adding energy to operate compressor 16, it can be seen that the impure liquid feed enters system 10 through feed duct 13 and is rapidly heated to the boiling temperature, which depends on the vacuum level in the boiler 12, by heat transferred from the vapor condensing in hot condenser tubes 14. Unvaporized concentrated feed liquid, containing a large proportion of impurities therein, is removed from the boiler 12 through line 15. The vapor produced by boiling at $P_1$, $T_1$ is drawn through moisture separator 29 and into duct 32 leading to turbine compressor 16. The pressure $P_1$ is maintained in boiler 12 at a level not exceeding a pressure corresponding to $T_1$ under saturated conditions by pressure regulating valve 30 disposed in duct 32. The vapor is substantially adiabatically compressed at a ratio of from 1.2:1 to 250:1, preferably 3:1–250:1, more preferably 5:1 to 100:1 and still more preferably 5:1 to 50:1, in compressor 16 to $P_2$, $T_2$ and, after leaving compressor 16, proceeds through turbine motor 18. The vapor substantially adiabatically expands through turbine 18 with a resultant pressure and temperature drop to $P_3$, $T_3$ and then proceeds through vapor return duct 34 to condenser tubes 14 in boiler 12. The heat transfer temperature differential between the returning vapor at $T_F$, i.e., the temperature of the vapor entering condenser tubes 14, and the feed water at $T_1$ must be high enough that large volumes of feed water can be accomodated in this system within the practical limits imposed by reasonable condenser size. The vapor condenses in tubes 14 giving up its heat of vaporization to the feed liquid entering the system through feed duct 13. Purified condensate may be removed from the system for general usage through line 36. Excess steam, if any, may be diverted through line 38 to keep the system in thermal balance, to heat the raw feed or to be injected into boiler 12, as will appear from a discussion of FIG. 4, or for other purposes. If desired, the vapor in return duct 34 may pass through an optional independent compressor 40 (shown in phantom) where it is compressed in a substantially adiabatic manner to a pressure greater than ambient and at least greater than the saturation pressure of the liquid at $T_1$. Use of an independent compressor assures a continuously high pressure vapor flow into the condenser tubes, irrespective of operational variations which may occur upstream thereof and reduces surges and eliminates any back pressure from the condenser. The independent compressor 40 may be driven by hot gases operating a linked turbine (not shown) or by motor means (not shown), such as electrical, gasoline or diesel engines.

In this embodiment, the energy to drive compressor 16, in addition to coming from coaxial turbine 18, is furnished by a completely concentric auxiliary compressor-turbine combination surrounding and directly linked to compressor 16. In this configuration, the outer compressor-turbine combination supplies rotary power to the inner system to improve the performance of the inner system. Extending from the spindle of compressor 16 and from the spindle of turbine 18 are shaft-extension members 22 and 24, respectively. Connected to shaft 22 are supports 704 which rotate auxiliary compressor 706 through its hollow spindle 708. Connected to shaft 24 are supports 710 through which shaft 24 is rotated by the hollow spindle 712 of auxiliary turbine 714. The blades 707 of auxiliary compressor 706 and blades 713 of auxiliary turbine 714 are arranged in an annular space 716 surrounding the inner compressor-turbine unit 16,18. The annular space 716 is separated from the clean vapor flow space 42 by a solid partition 701 and sealing rings 702. In a preferred form of the invention, auxiliary turbine 714 is operated by in situ produced combustion gases. Annular space 716 operates as a combustion chamber into which fuel is admitted through injectors 718 and air is admitted through space 720. In space 716 the fuel is mixed with air and igniters 703 initiate combustion of the fuel and air. The resulting hot combustion gases are mixed with air drawn into space 716 via space 720 and control valve 724 by rotation of compressor blading 707, which air is compressed by a compressor 706 in passing therethrough. After passing auxiliary turbine 714, the hot combustion gases and compressed air exhaust through space 722 and never come in contact with the clean vapor which moves through space 42 and return duct 34. As the combustion gases and air drawn into space 716 pass through turbine 714, they do work on the turbine blades 713 causing turbine 714 to rotate and to transmit power through supports 710 to shaft 24, which power is utilized by coaxial compressor 16 in doing work on the vapors flowing in space 42 and by auxiliary compressor 706 in compressing air drawn by it into space 716. In an alternative form of this embodiment, combustion or other gases from an external source may be drawn into annular space 716 via space 720 and valve 724, in which case space 716 need not operate as a combustion chamber.

The dirty hot combustion gases or other gases in space 716 exhausting turbine 714 still possess substantial thermal energy and are directed, for disposal or use, either through space 722 or into heat exchanger section duct 723 via duct valve 725 and then through heat exchanger 727. When passed into the heat exchanger 727, heat from the exhausting gases is transferred to the clean vapor in return duct 34. Since exhaust combustion gases are at a temperature in excess of 500° F. and a pressure of 25 psia or greater, they can substantially increase the vapor temperature, $T_3$, to $T_4$ before the vapor enters the condenser tubes 14. In this way the temperature difference in the condenser, $T_F-T_1$, which in this case is $T_4-T_1$, is increased, thereby permitting the system to accommodate a greater flow rate or to minimize condenser size. The hot gases exhausting through space 722 can also perform useful work such as operating a low pressure turbine (not shown) for driving optional independent compressor 40, heating the influent raw feed in a heat exchanger (not shown) disposed in duct 13 and/or heating the raw feed in evaporator 12 by means of heat exchange coils (not shown) in the evaporator. In the case where the hot gas flowing through the auxiliary turbine 714 are clean gases, such as steam, the clean gases can be injected back into the vapor in return duct 34 at a point upstream of condenser 14 or directly into condenser 14.

Additional flexibility can be built into the system by using variable ratio compressors and variable length telescoping condenser section tubing. The latter can be achieved using telescoping condenser tubes which can be telescoped to the desired condenser area by mechanical or hydraulic means. The former can readily be achieved in a number of ways, for example:

(1) at least some of the compressor rotor blades can be made to telescope into and out of the spindle by mechanical or hydraulic means;
(2) the airflow passage through the compressor can be varied by varying the distance between the stator walls and the spindle using mechanical or hydraulic means;
(3) at least some of the stators can be made to telescope into the walls by mechanical or hydraulic means;
(4) at least some of the compressor stages may be made to be declutched from the power supply shaft so as to offer resistance to vapor flow therethrough;
(5) the compressor may be geared and clutched to the power supply shaft so that compressor speed can be varied Numerous modifications can be made to the auxiliary compressor-turbine configuration illustrated in FIG. 1 to alter it and/or improve it for particular usages. Thus, supports 704 and 710 could be formed into air foil shaped fans to assist in the movement of large masses of gas. Still another modification involves clutching and gearing the outer compressor-turbine combination to the inner compressor-turbine combination in order that the rate of rotation of the latter could be varied with respect to the former. Another useful modification is the addition of further compressor-turbine combinations in concentric relationship to the two shown in FIG. 1, all with the purpose of increasing the motive power available for compression in compressor 16 and of utilizing available energy sources, such as dirty combustion gases, in as economical a manner as is possible. The fundamental advantage of the configuration of FIG. 1 is that it enables utilization of as many different combustion gas sources and/or combustible fuels as may be available at the system location for supplying economical power to compress the vapors flowing in space 42.

Figure 2:
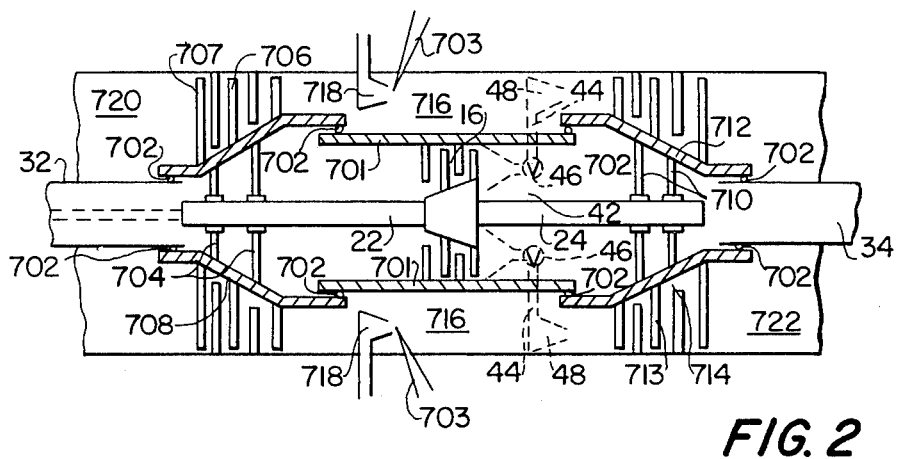
FIG. 2 illustrates schematically an alternative vapor treatment section comprising a compressor but no turbine, which section may be employed in conjunction with or in place of the system of FIG. 1.

An alternative and somewhat simpler embodiment of the present invention is illustrated in FIG. 2 which shows a vapor treatment section similar to the corresponding section of FIG. 1 except that coaxial turbine 18 and compressor-turbine shaft 20 have been eliminated. This configuration is especially useful where compressor 16 has a low compression ratio and where the evaporator temperature $T_l$ is about 212° F. and the influent raw feed temperature is relatively low. In this type of system, it is desirable to operate the condenser 14 at a pressure somewhat above ambient in order to increase the rate of condensation therein.

When comparing the operational and cost characteristics of the systems of FIGS. 1 and 2, it is noteworthy (see Table I) that the cost for the FIG. 2 embodiment increases as compression ratio increases, all else being equal, because increased energy is required in the auxiliary system to operate at the higher compression ratios. However, higher flow rates are attainable in the compressor only form of the invention because the temperature differential in the condenser is normally higher. On the other hand, in the FIG. 1 embodiment, increasing the compression ratio does not increase operational costs because the coaxial turbine is able to extract more work from the higher pressure, higher temperature vapor exiting the compressor. In fact, since turbines are notoriously more efficient at higher pressures, increasing the compression ratio also increases the efficiency of the energy exchange in the turbine. However, the fixed costs of capitalization do increase as the compression ratio increases although even at high compression ratios the present system is anticipated to cost less than heretofore known systems taking into account system flexibility and the like. A comparison of the relative effect of using or omitting coaxial turbine 18 is detailed in Examples I–IV.

A unique aspect of the FIG. 2 embodiment resides in the optional ability to divert a portion of the $P_2$, $T_2$ vapor exiting compressor 16 to flow directly through the auxiliary turbine blading to supplement and mix with the flow of combustion gases or other gases therein which normally drive the auxiliary turbine. The effect of this diversion is to increase the shaft energy available to drive compressor 16 and thereby to increase the vacuum drawn in evaporator 12 or increase the compression ratio or decrease the input of energy from an external source. Of course, diverting a portion of the compressed vapor will result in lower flow rate of distilled, purified liquid. However, the flow rate reduction may be an acceptable alternative for reducing the cost of operation per thousand gallons in cases where only relatively small flow rates are needed and where external energy sources to drive the auxiliary turbine are costly. To achieve the desired diversion of compressed vapor flow, a fraction of the flow, controlled by bypass valve 46 (shown in phantom), is directed into conduit 44 (shown in phantom) connecting flow space 42 downstream of compressor 16 with annular flow space 716. The diverted flow in conduit 44 passes through solid partition 701 and is preferably injected into flow space 716 using nozzles or injectors 48 (shown in phantom).

The systems illustrated in FIGS. 1 and 2 and the embodiments to be described hereinafter are useful even when the impure liquid feed contains dissolved salts which can precipitate and form scale on the outside of the condenser tubes and on the boiler walls at relatively high evaporation temperatures. Because scale deposits interfere with efficient heat transfer between the condensing vapor in the tubes and the feed liquid in the boiler, it is undesirable to operate the system at a boiler temperature at which scaling occurs. Therefore, when sea water containing calcium sulfate, magnesium hydroxide, calcium carbonate, and the like, is the liquid feed, since these salts are more soluble in cold sea water than in sea water above about 160° F., at temperatures above 160° F. scale will rapidly form on the hot tubes and condenser surfaces and will, in a short time, render the system operative only at very low thermal efficiencies. Therefore, if sea water is the liquid feed, boiler temperature $(T_l)$ should be kept below 160° F. and preferably below 150° F. The system can still treat very large volumes of liquid feed in an efficient manner by maintaining a vacuum in the boiler at a level such that the boiling of the liquid feed is accomplished within the no-scaling temperature limitations. Thus it is very important to be able to evaporate at low boiler temperatures, particularly below 160° F., a range in which conventional vapor compression systems cannot operate.

The lower limit of $T_l$ is dictated by practical considerations since the system is unsuited for treating solid feed. Therefore, $T_l$ should never be below the freezing point at ambient conditions of the liquid being treated, which for water feeds at 1 atm. is 0° C. (32° F.) corresponding to a $P_l$ under substantially saturated conditions of 0.006 atm. $T_l$ for water feeds is most suitably at 33° F. or above. $T_l$ is preferably almost as high as the boiling point of the liquid under ambient conditions, which for water at 1 atm. is 212° F., e.g., at about 211° F. and 0.99 atm. For non-aqueous systems, which at 1 atm. boil above or below the boiling point of water, the preferred temperature limits of this system remain from just above the freezing point to just below the boiling point. This is so even for so-called high boiling organic substances, which boil above 212° F. At the reduced pressure in the evaporator, even these type liquids boil at significantly lower temperatures and can be practically employed. In a particular form of the invention which illustrates the advantages of the invention over conventional vapor compression systems and the advantages of evaporating at low pressures in the boiler, $T_l$ is in the range from just above the freezing point, which for water feeds is 33° F., to at least 10° F. below the boiling point, which for water feeds is conveniently about 200° F., and more desirably 33°–160° F. At these low temperatures, the compression ratio should be in the range 3:1 to 250:1 and desirably 5:1 to 250:1.

Although it is anticipated that the vast majority of users will wish to operate under the preferred temperature conditions and, in most circumstances, it is most economical to operate under these conditions, there are circumstances where it will be desirable to operate at or above the boiling point of the liquid and at or above ambient pressure. For example, if the raw feed liquid is available from its source at or above its boiling point it may be more economical to operate the system above ambient pressure. In some cases high evaporation temperatures will be beneficial where use of flash distillation apparatus is contemplated. It may also be desirable to employ high temperatures where the influent feed is sea water and brine pre-heating together with chemical additions to the feed is employed to raise the feed temperature and prevent scaling. However, absent some special circumstance, the present invention is preferably operated between the freezing and boiling point of the raw liquid feed at ambient conditions and at a pressure below ambient pressure.

In those situations where the present invention is to be practiced at or above the boiling temperature of the liquid determined at ambient pressure and at or above ambient pressure, the temperature in the boiler, $T_b$, should be less than about the critical temperature, i.e., the temperature above which the vapor cannot be condensed regardless of the pressure applied thereto, which for water is about 705.47° F. For obvious reasons, as a practical matter, it is unlikely that one would choose to operate at such a high temperature in view of the very substantial equipment and energy costs which would be incurred. However, the system will operate as described herein at any temperature from boiling up to the critical temperature, determined under ambient conditions, provided only that the system parameters are controlled to assure a temperature differential in the condenser between the vapor in the condenser return line and the raw feed liquid. There should be no difficulty in adjusting the system parameters to assure this temperature differential, although it should be understood that in some cases the system may have to operate at something less than optimum cost conditions. Even when the system operates in the range above 212° F. the boiler temperature will, in most cases be less than about 350° F. and the corresponding pressure, $P_b$, will therefore be a pressure not exceeding a pressure corresponding to the evaporation temperature under saturated conditions.

With the foregoing general description of the operation of a few embodiments of a single stage vacuum distillation-vapor compression system serving to set forth the fundamentals of the present invention, before other embodiments and variations are described, it will be useful to consider the following more specific examples of the operation of the instant system. Accordingly, the following illustrative examples are offered by way of further explanation and are not intended to expressly or impliedly limit the scope of the invention.

EXAMPLE I

This Example, employing the embodiments of FIGS. 1 and 2, utilizes impure water as the feed liquid and assumes an initial boiler temperature $T_I$ of 198° F. or 658° R. from which the initial vapor pressure in the boiler, $P_1$, can be determined from standard charts to be 11.058 psia. The enthalpy of the saturated vapor under these conditions is given by standard tables to be $H_I = 1145$ BTU/lb. The chosen compression ratio (CR) for variable compression ratio compressor 16 is 15:1, i.e., $P_2/P_I = 15/1$.

From the ideal gas law applied to adiabatic compressions and expansions and assuming that the heat capacities at constant volume and pressure, $C_v$ and $C_p$, are constant, it is known that:

$$T_2/T_I = (P_2/P_I)^b$$

where $b = (\gamma - 1)/\gamma$ and $\gamma = C_p/C_v$.

Adopting the physical constants for water disclosed in U.S. Pat. No. 3,243,293—Holden, b=0.2445, and substituting $P_2 = 15 P_I$ and $T_I = 658°$ R. in to above equation:

$$T_2 = 658 \, (15)^{0.2445} = 1276° \text{ R. } (816° \text{ F.})$$

Inasmuch as $P_2 = 15 P_I$; $P_2 = 165.87$ psia. From the steam tables it can be seen that at $T_2 = 816°$ F., $P_2 = 165.87$ psia, the enthalpy of the compressed vapor can be determined to be $h_2 = 1435$ BTU/lb.

The demand work, $W_D = W_I$, or work done by compressor 16 on the vapor, is defined by the relationship:

$$W_D = W_I = h_2 - h_I$$

where $h_I$ is the enthalpy of the uncompressed vapor at $T_I = 198°$ F., $P_I = 11.058$ psia. Substituting the known values of $h_2$ and $h_I$ yields $$W_D = W_I = 290 \text{ BTU/lb.}$$

The final temperature, $T_F$, of the vapor reaching the condenser tubes, assuming no independent compressor and valve 725 closed, is $T_F = T_2 = 816°$ F. in the FIG. 2 embodiment where there is no turbine 18 present.

The final temperature, $T_F$, where there is a coaxial turbine 18 present (FIG. 1), can be determined from the following expression for a substantially adiabatic expansion through the turbine:

$$T_F = T_I (P_F/P_I)^{0.2445}$$

Assuming $P_F = 14.696$ psia, and substituting known valves for $T_I$ and $P_I$, $$T_F = 245° \text{ F.}$$

In the compressor only configuration, $h_F = h_2 = 1435$ BTU/lb. In the compressor-turbine configuration, $h_F$ at 245° F. and 14.696 psia can be determined from the steam tables to be 1166 BTU/lb.

The energy amount which must be added to the system, either through the auxiliary turbine or by direct driving the compressor, to power compressor 16 may be defined as make-up work and designated as $W_{MU}$. For the compressor only configuration, $W_{MU} = W_D = 290$ BTU/lb. For the compressor-turbine configuration:

$$W_{MU} = h_F - h_I$$

Substituting the known valves for $h_F$ and $h_I$:

$$W_{MU} = 21 \text{ BTU/lb}$$

EXAMPLE II

To demonstrate that the instant system can in fact purify large volumes of impure water using equipment, specifically a condenser, of reasonable size and availability, it is assumed herein that compressor 16 can maintain the boiler pressure $P_I$ at 11.058 psia by removing vapor therefrom as rapidly as it is produced. In this case, the rate of flow of vapor is solely dependent on the rate that the heat of vaporization is transferred to the feed liquid. The heat of vaporization of water boiling at 198° F. and 11.058 psia is $Q_v = 979$ BTU/lb and the effective temperature difference between the condensing vapor and the feed liquid at $P_F = 14.696$ psia is $\Delta T_{LM}$. $\Delta T_{LM}$ is the log mean temperature difference during condensation which, together with the initial temperature of the impure liquid, $T_b$, and the desired final distillate effluent temperature, $T_D$, determines the required condenser size.

$$\Delta T_{LM} = \Delta T_{max} - \Delta T_{min} / \ln(\Delta T_{max}/\Delta T_{min})$$

where $\Delta T_{max} = T_F - T_I$, $\Delta T_{min} = T_D - T_I$, and $T_D$ is selected to be equal to or less than the vapor condensation temperature and greater than $T_I$. For this Example, $T_D = 205°$ F. Calculating $\Delta T_{LM}$ for $T_I = 198°$ F. and $T_F = 816°$ F. for the compressor only embodiment and $T_F = 245°$ F. for the compressor-turbine embodiment yields $\Delta T_{LM} = 290°$ F. for the compressor only embodiment and $\Delta T_{LM} = 21°$ F. for the compressor-turbine embodiment.

The surface area A in square feet of a condenser required to condense R gallons/hr of condensate at 198° F. having a heat of vaporization, $Q_v$, of 979 BTU/lb through an effective temperature differential equal to $\Delta T_{LM}$ in a stainless steel condenser having a coefficient of heat transfer "h" of 250 BTU/hr−°F−ft² can be determined from the following relationship:

$$A = RQ_v / h \Delta T_{LM}$$

Rewriting in terms of R:

$$R = Ah\Delta T_{LM}/Q_v$$

It is known that a conventional condenser unit, such as is manufactured by the Pfaudler Company of Rochester, NY, which is 5 feet long and 5 feet wide has an effective surface area for heat transfer of 2988 ft.². Therefore, the length L of such a unit necessary to provide A ft.² of surface area is denoted by the formula:

$$A/2988 \times 5 = L$$
$$A = 2988L/5$$

Inserting the aforementioned values for h, and A, assuming L = 40' and converting units to gal/hr yields:

$$R = 747{,}000\Delta T_{LM}/Q_v$$

At $\Delta T_{LM} = 290°$ F. and 21° F. and $Q_v = 979$ BTU/lb. The following flows can be accomodated and condensed:

Compressor only
R = 104,051 gal/hr
Compressor-turbine
R = 16,028 gal/hr

EXAMPLE III

The cost to produce the flows R determined in Example II depends upon the make-up work, $W_{MU}$, which has to be done.

The work, $W_{MU}$, is the work that must be added to the system by direct driving the compressor through motor means 26 or by addition of hot gases through auxiliary turbine 714, or both, or otherwise. The cost can be determined by assuming that the cost to produce energy is about ?2.70/1,000,000 BTU. Therefore, the cost/1,000 gallons to operate the present system is the cost of the make-up work. Expressing this in terms of make-up work, we find:

$$\text{Cost}/1{,}000 \text{ gal} = 2.16 \times 10^{-4}(W_{MU})$$

This works out, for each of the FIGS. 1 and 2 embodiments, to be:
Compressor only
Cost/1,000 gal = $6.26
Compressor-turbine
Cost/1,000 gal = $0.45

This cost value is, of course, idealized and does not take into account system inefficiencies. Therefore, actual costs will be somewhat higher. Furthermore, all thermodynamic calculations assume an isentropic reversible process which is an approximation of a real process.

EXAMPLE IV

The values calculated by the methods described in Examples I-III have been determined for other compression ratios in compressor 16 assuming the same $T_I = 198°$ F. to show the effect of compression ratio in cost. Table I shows these values for water for compressor only (O) and compressor-turbine (T) embodiments and for a representative sampling of compression ratios of 2:1, 5:1, 15:1, 25:1 and 100:1, although it will be appreciated that the only limitation on compression ratio is the availability of equipment. Table I also shows a sampling of calculated data for temperatures ($T_I$) above and below 198° F. For purposes of constructing the table, distillate effluent temperature, $T_D$, is taken as 205° F. for each example in which $T_I$ is 198° F. or less and as 210° F. for $T_I$ above 198° F.

TABLE I

| | (°F.) $T_1$ | (psia) $P_1$ | BTU/lb $h_1$ | BTU/lb $Q_V$ | CR | (psia) $P_2$ | (°F.) $T_2$ | BTU/lb $h_2$ | BTU/lb $W_{DS}$ | (°F.) $T_F$ | BTU/lb $h_F$ | BTU/lb $W_{MU}$ | (°F.) $T_{LM}$ | $/1000 gal Cost | gal/hr R |
|---|---|---|---|---|---|---|---|---|---|---|---|---|---|---|---|
| T | 198 | 11.058 | 1145 | 979 | 2 | 22.12 | 319 | 1200 | 55 | 245 | 1166 | 21 | 21 | 0.45 | 16,028 |
| O | 198 | 11.058 | 1145 | 979 | 2 | 22.12 | 319 | 1200 | 55 | 319 | 1200 | 55 | 40 | 1.19 | 30,522 |
| T | 198 | 11.058 | 1145 | 797 | 5 | 55.29 | 515 | 1291 | 146 | 245 | 1166 | 21 | 21 | 0.45 | 16,028 |
| O | 198 | 11.058 | 1145 | 979 | 5 | 55.29 | 515 | 1291 | 146 | 515 | 1291 | 146 | 81 | 3.15 | 62,035 |
| T | 198 | 11.058 | 1145 | 979 | 15 | 165.87 | 816 | 1435 | 290 | 245 | 1166 | 21 | 21 | 0.45 | 16,028 |
| O | 198 | 11.058 | 1145 | 979 | 15 | 165.87 | 816 | 1435 | 290 | 816 | 1435 | 290 | 136 | 6.26 | 104,051 |
| T | 198 | 11.058 | 1145 | 979 | 25 | 276.45 | 985 | 1519 | 374 | 245 | 1166 | 21 | 21 | 0.45 | 16,028 |
| O | 198 | 11.058 | 1145 | 979 | 25 | 276.45 | 985 | 1519 | 374 | 985 | 1519 | 374 | 165 | 8.08 | 126,031 |
| T | 198 | 11.058 | 1145 | 979 | 50 | 552.9 | 1252 | 1657 | 512 | 245 | 1166 | 21 | 21 | 0.45 | 16,028 |
| O | 198 | 11.058 | 1145 | 979 | 50 | 552.9 | 1252 | 1657 | 512 | 1252 | 1657 | 512 | 209 | 11.06 | 159,317 |
| T | 198 | 11.058 | 1145 | 979 | 100 | 1105.8 | 1568 | 1826 | 681 | 245 | 1166 | 21 | 21 | 0.45 | 16,028 |
| O | 198 | 11.058 | 1145 | 979 | 100 | 1105.8 | 1568 | 1826 | 681 | 1568 | 1826 | 681 | 258 | 14.71 | 197,095 |
| T | 122 | 1.7889 | 1114 | 1024 | 25 | 44.722 | 819 | 1442 | 328 | 514 | 1295 | 181 | 199 | 3.91 | 145,169 |
| O | 122 | 1.7889 | 1114 | 1024 | 25 | 44.722 | 819 | 1442 | 328 | 819 | 1442 | 328 | 289 | 7.08 | 210,823 |
| T | 33 | 0.09223 | 1076 | 1075 | 200 | 18.446 | 1340 | 1715 | 639 | 1243 | 1662 | 586 | 532 | 12.66 | 369,678 |
| O | 33 | 0.09223 | 1076 | 1075 | 200 | 18.446 | 1340 | 1715 | 639 | 1340 | 1715 | 639 | 560 | 13.80 | 389,135 |
| T | 205* | 12.77 | 1148 | 975 | 5 | 63.85 | 525 | 1295 | 147 | 228 | 1158 | 10 | 11.8 | 0.22 | 9,041 |
| O | 205* | 12.77 | 1148 | 975 | 5 | 63.85 | 525 | 1295 | 147 | 525 | 1295 | 147 | 75.7 | 3.18 | 57,998 |

*$T_D$ for these entries is 210° F.

It will be appreciated that the auxiliary compressor-turbine system 700 is in reality no different than a conventional gas turbine, the exhaust or combustion gases of which are at a comparatively high temperature. For this reason the embodiments of FIGS. 1 and 2, involving direct combustion in annular space 716, are not desirably employed in a system wherein the impure liquid is or contains highly volatile inflammables. If the FIG. 1 or 2 system must be used with volatile combustibles, sufficient insulation must be provided to thermally isolate the auxiliary system flow space 716 from the combustible-containing flow space 42. In addition, in lieu of direct combustion, where possible the auxiliary turbine 714 should be driven by lower temperature combustion gases or steam supplied from external sources. The system of FIG. 3, which is described more fully hereinafter, is particularly well suited for this type application.

Figure 3:
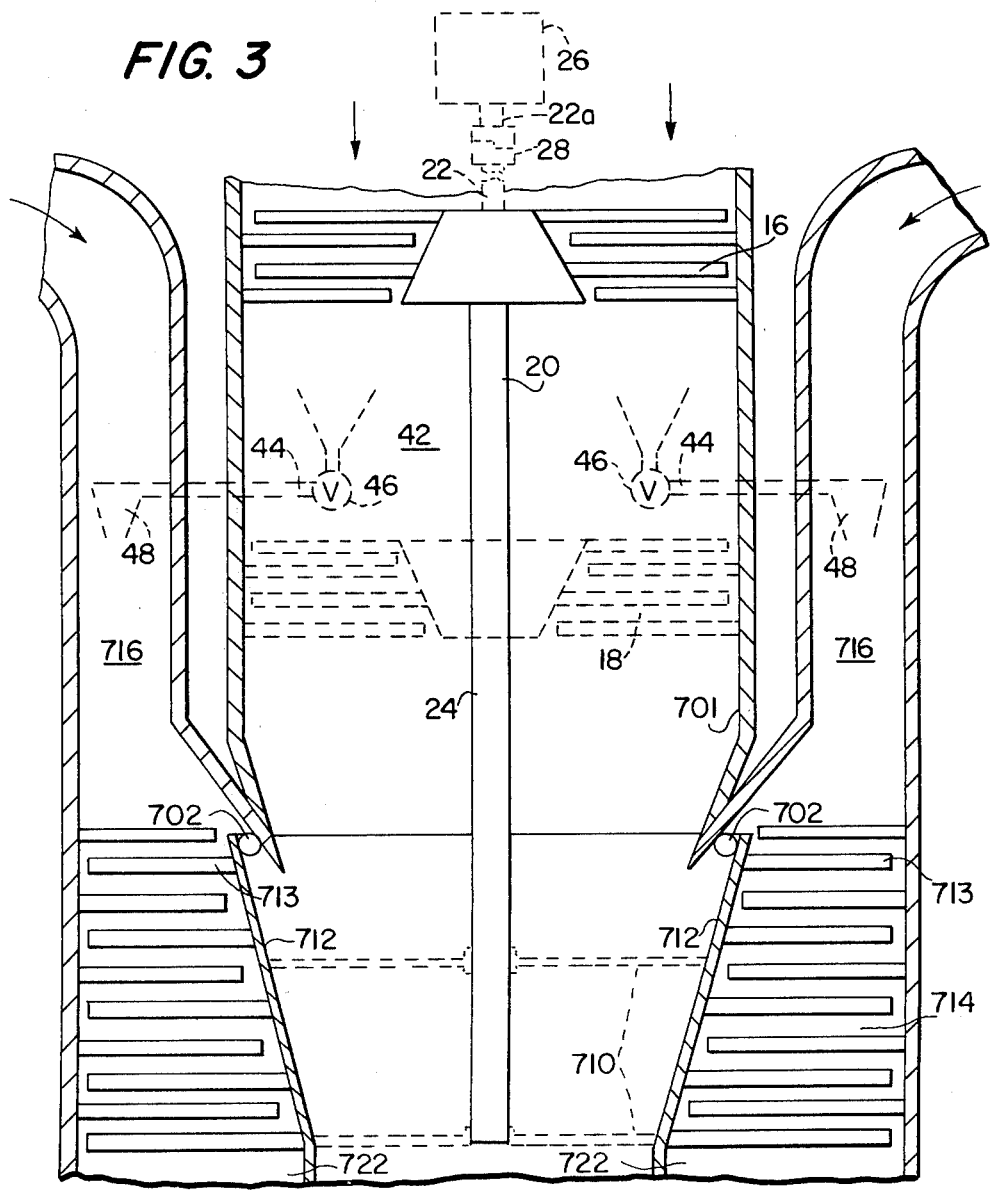
FIG. 3 illustrates schematically still another vapor treatment section useful in the embodiment of FIG. 1, wherein the vapor treatment section includes a compressor, an optional in-line turbine, and an auxiliary turbine configured to be operated using available hot gases.

FIG. 3 illustrates an embodiment of the present system which permits the use of virtually any available hot gases, whether they be clean or dirty, combustion gases or steam, to provide motive power for driving the auxiliary turbine 714 and, in turn, through the shaft link, for driving the vapor compressor 16 as well. In this embodiment, the gases passing through the auxiliary system do not actually mix with the clean vapor in the primary system, and, therefore, the purity of the condensate produced by the system is not compromised, e.g., by use of dirty combustion gases for additional motive power. In FIG. 3 there is shown a configuration which includes either the compressor-turbine combination 16, 18 taught in FIG. 1 or only the compressor 16 taught in FIG. 2 as the components of the primary or internal system. Thus the turbine 18 is optional and is shown in phantom. The system of FIG. 3 includes compressor 16 linked through shaft 20 to optional turbine 18 and shaft portions 22 and 24 projecting axially from the spindles of compressor 16 and optional turbine 18, respectively. The system also includes a clean or dirty gas operated auxiliary turbine 714 which consists essentially of a hollow spindle 712 and blades 713 attached to the outside surface of the hollow spindle. The spindle 712 is drivingly linked to shaft portion 24 through supports 710. Shaft portion 24 is operatively linked with the spindle of optional turbine 18 which spindle is joined through shaft 20 to the spindle of compressor 16. Where optional turbine 18 is not used, shafts 20 and 24 merge into a single shaft which is herein designated 24. In operation, the system is energized by starting motor 26 acting through shaft extension 22a and clutch 28. Auxiliary gas turbine 714 is disposed with its blades 713 arranged in flow space 716, which flow space is annularly arranged with respect to primary or clean vapor flow space 42 and which is separated therefrom by a solid paritition 701 and sealing rings 702. In this manner, the hot gases, which may be dirty combustion gases, are directed through space 716 to act on turbine blades 713, which, through spindle 712 and supports 710, rotate shaft 24. The expanded auxiliary gases exhaust from the turbine 714 into space 722 in such a manner that they never combine or mix with the clean vapor in the primary system unless it is specifically desired to cause them to combine.

In FIG. 3, particularly in the form thereof wherein turbine 18 is omitted, it may optionally be desirable to divert a portion of the $P_2$, $T_2$ vapors exiting compressor 16 to annular flow space 716 to provide a portion of the motive power used to operate auxiliary turbine 714. Thus, a fraction of the compressed vapor flow, controlled by bypass valve 46 (shown in phantom), is directed into conduit 44 (shown in phantom) connecting flow space 42 with annular flow space 716. The diverted flow in conduit 44 passes through solid partition 701 and is preferably injected into flow space 716 using nozzles or injectors 48 (shown in phantom).

Figure 4:
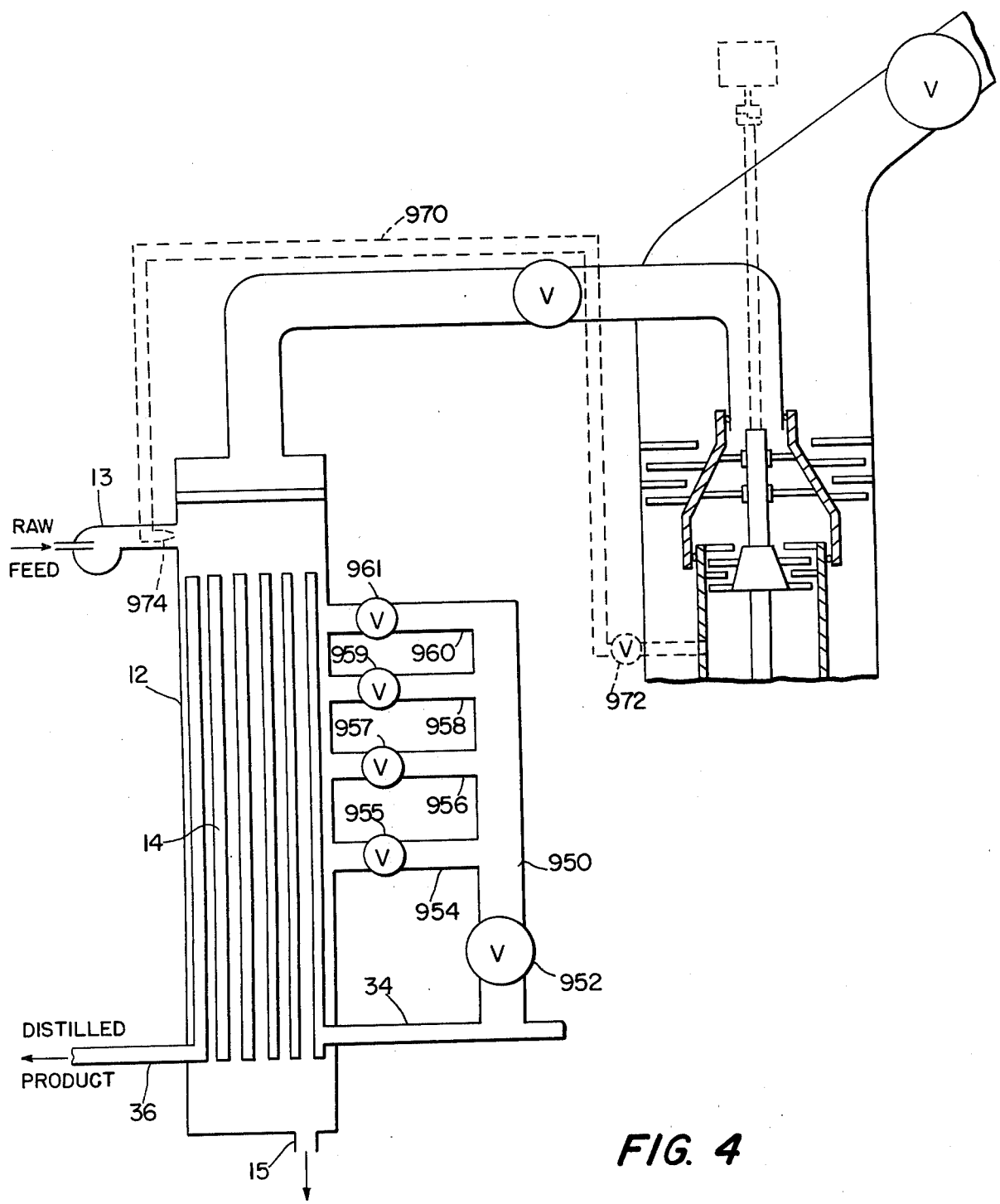
FIG. 4 illustrates schematically the single stage embodiment of FIG. 1, with the vapor treatment section deleted, including means for diverting a portion of the effluent vapor for direct mixing with the raw feed liquid.

FIG. 4 illustrates a modification which is equally applicable to all embodiments of the present invention, indeed to all vacuum and flash distillation systems, whether or not an independent compressor is used, whether or not coaxial turbine is used and whether the auxiliary turbine is driven by in situ produced combustion gases, steam, hot gases from an external source or any other form of gas. In accordance with this modification, a fraction of the compressed vapor returning to the condenser tubes 14 through duct 34 is diverted and directly injected into the boiler 12 where it mixes with the impure feed liquid therein, giving up its latent heat of vaporization and raising the temperature of the feed liquid in the boiler, e.g., as high as to $T_1$. This is particularly useful and important where the raw feed entering duct 13 is relatively cold, e.g., water at about 33°–70° F. If the temperature in boiler 12 is maintained at such a low temperature, it is necessary for $P_1$ to also be low for boiling to occur at $T_1$. However, it is very expensive to draw and maintain a high vacuum in the boiler and, rather than do so, it may be desirable to raise the raw feed temperature to a value at which the system may be more economically operated. The expense of raising the raw feed temperature of $T_1$ by diverting a fraction of the returning vapor and directly mixing it with the feed water is readily measured since whatever flow is diverted does not exit the system as purified liquid through line 36. On the other hand, direct mixing in the boiler is a far more efficient means of heating the raw feed than, for example, by diverting the returning vapor through an external heat exchanger in which it can heat raw feed or by passing all the returning vapor through condenser tubes 14, as in the other embodiments of this invention.

In FIG. 4, the details of the vapor treatment section of the system are not shown since this modification is equally applicable to all embodiments described herein. Compressed vapor exiting the optional independent compressor 40 or leaving the compressor 16 or optional turbine 18, depending upon the embodiment, is directed to the condenser tubes 14 through return duct 34. This compressed vapor is at a temperature, $T_F$, and has an enthalpy, $h_F$. A portion of this vapor is diverted through duct 950 and its associated valve 952 into ducts 954, 956, 958 and 960 and their respective valves 955, 957, 959 and 961 for injection back into boiler 12. Although four injection ducts are shown, it will be appreciated that any number of such ducts may, in practice, be used. The remaining or undiverted vapor continues through duct 34 into condenser tubes 14 and exits the system as purified effluent through line 36. The fraction of the vapor which must be diverted to heat the raw feed can be calculated by assuming that the temperature of the impure raw feed liquid in feed duct 13 is $T_o$ and its enthalpy is $h_o$. The enthalpy change required, per pound of raw feed, to heat from $T_o$ to $T_1$ is $(h_1-h_o)$. In order to produce this change, a fraction, $F_D$, of returning vapor, e.g., steam, at $h_F$ must be diverted through duct 950 and admixed with the feed liquid, condensing in the process and having a final temperature of $T_1$. For one pound of returning vapor, the enthalpy change is $h_F-h_1$ and the fractional change is $F_D$ $(h_F-h_1)$. Since the enthalpy change in the condensing vapor must equal the enthalpy change of the raw feed, it can be determined that:

$$F_D = h_1 - h_o / h_F - h_o$$

From this relationship the fraction of compressed vapor diverted from duct 34 into duct 950 can be determined for various raw feed temperatures and desired boiler temperatures. By similar well known techniques the flow rate of effluent, $R_D$, which continues on through the condenser tubes and exits line 36 can be readily calculated from a knowledge of R, the flow rate under the same conditions but with no diverted flow, and by assuming equal cost per 1000 gal., to be $R_o = R(1-F_D)$.

An optional aspect of the system shown in FIG. 4 involves the use of return line 970 and associated valve 972 (shown in phantom) to divert a small portion of the flow exiting compressor 16 back to raw feed duct 13 wherein it is injected through injector 974 (shown in phantom). In this way, the vapor injected through injector 974 will create a pumping effect in duct 13 to aid the feed of liquid therethrough while, at the same time, heating the incoming feed liquid. Line 970 is optional, although useful, because its contribution to the heating of the raw feed is small compared to the vapors injected directly into boiler 12 through ducts 954,956,958 and 960 and because the vacuum drawn by compressor 16 is generally adequate to draw the raw feed into the boiler.

It will be appreciated that the various vapor treatment embodiments hereinbefore described, which permit varying the initial parameters in the evaporator and compression means, allow the rapid and economic treatment of practically any impure liquid. The flexibility of the system, which contemplates evaporation in multi or single stage evaporators, whether by vacuum distillation or flash distillation, offers the greatest potential for dealing with present ecological needs while at the same time achieving rapid purification. Thus it is practical to build an installation wherein a number of evaporators, arranged in parallel, feed into a vapor treatment section to allow various influents to be brought into holding tanks associated with the evaporators, and any evaporator brought on line at any desired time. It is also contemplated that one evaporator could be fed through flexible influent conduit that could be sectionally assembled to be as long as is necessary, for example several miles, to permit the drawing of influent from offshore points at sea. This will allow a land-based system to effectively and rapidly deal with chemical or oil spills in offshore regions. By comparison, conventional vapor compression systems, typically employing low compression ratios and necessarily operating near the boiling point of the liquid under ambient conditions, are neither capable nor flexible enough to deal with the many diverse influents and influent conditions for which high volume, rapid purification may be desirable.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

We claim:

1. A method for high volume distillation of impure liquids comprising the steps of:

(a) evaporating said impure liquid in an evaporator to form a vapor at a temperature above the freezing point and below the critical temperature of said liquid and at a pressure not exceeding a pressure corresponding to said evaporation temperature under saturated conditions;

(b) compressing said vapor such that the ratio of vapor pressure of said vapor following compression to evaporated liquid vapor pressure is in the range 1.2:1 to 250:1;

(c) adding sufficient energy to operate said compression step at least a portion of said energy being added by passing a hot gas through a means for expanding said gas whereby at least a portion of the energy is produced for operating said compression step, said hot gas comprising at least in part a gas other than said vapor produced in subparagraph (a) hereof;

(d) cooling said vapor in heat transfer relation with said impure liquid whereby said vapor at least partially condenses, transferring sufficient heat to said impure liquid for evaporating at least a part of said liquid and to form a vapor therefrom having said temperature and pressure characteristics set forth in sub-paragraph (a) hereof; and (e) collecting said condensed vapor.

2. A method, as claimed in claim 1, wherein said impure liquid is water and said evaporation temperature is in the range 33°–200° F.

3. A method, as claimed in claim 1, wherein said impure liquid is evaporated to form a vapor at a temperature in the range 33° F. to 160° F.

4. A method, as claimed in claim 1, wherein at least a portion of said energy is added by an external mechanical energy source.

5. A method, as claimed in claim 1, wherein said impure liquid is evaporated to form a vapor at a temperature in the range 33° F. to 211° F.

6. A method, as claimed in claim 5, wherein said vapor has a pressure below atmospheric and corresponds to the saturated vapor pressure of the liquid at the vapor temperature.

7. A method, as claimed in claim 1, wherein said condensation of vapor occurs in said evaporator and said released heat is transferred to said impure liquid in said evaporator to evaporate said liquid.

8. A method, as claimed in claim 1, wherein the ratio is in the range 5:1 to 100:1.

9. A method, as claimed in claim 8, wherein the ratio is in the range 5:1 to 50:1.

10. A method, as claimed in claim 1, wherein said vapor is compressed in a substantially adiabatic manner.

11. A method, as claimed in claim 1, including the step of diverting a fraction of said vapor prior to cooling and injecting said diverted vapor fraction directly into said impure liquid at a point upstream of said evaporator, whereby said vapor condenses and said impure liquid is heated.

12. A method, as claimed in claim 1 wherein said energy from expanding said hot gas is obtained by directing a flow of hot gas through a space separate from the space in which said vapor flows, said hot gas flow in said hot gas flow space passing through means for expanding said gas.

13. A method, as claimed in claim 12, including the steps of drawing air through said hot gas flow space for mixing with said hot gas flow therein, passing said air through means for compressing said air prior to mixing with said hot gas flow, and drivingly linking said hot gas expanding means in said hot gas flow space with said air compressing means in said hot gas flow space, whereby at least a part of the energy produced by expanding said hot gas flow is used to operate said air compressing means.

14. A method, as claimed in claim 13, further including the steps of admitting fuel into said hot gas flow space upstream of said hot gas expanding means and igniting said fuel, whereby said hot gas flow is produced in said space.

15. A method, as claimed in claim 14, wherein said hot gas flow space is annularly disposed with respect to the space in which said vapor flows.

16. A method, as claimed in claim 14, wherein said impure liquid is evaporated to form a vapor at a temperature in the range 33° F. to 211° F.; and wherein said condensation of vapor occurs in said evaporator and said released heat is transferred to said impure liquid in said evaporator to evaporate said liquid.

17. A method, as claimed in claim 13, wherein said hot gas flow space is annularly disposed with respect to the space in which said vapor flows.

18. A method, as claimed in claim 12, wherein said hot gas flow space is annularly disposed with respect to the space in which said vapor flows.

19. A method as claimed in claim 1 including the step of passing at least a portion of said hot gas flow downstream of said hot gas expanding means in heat exchange relationship with said vapor to transfer heat from said gas to said vapor.

20. A method as claimed in claim 12, including the step of diverting a fraction of said compressed vapor and directing said diverted fraction through said hot gas flow space for motivating said auxiliary turbine means.

21. A method, as claimed in claim 20, wherein said hot gas flow space is annularly disposed with respect to the space in which said vapor flows.

22. A method, as claimed in claim 1, wherein said vapor temperature is below the boiling point of said liquid at ambient pressure.

23. A method, as claimed in claim 1, further including the step of passing at least a portion of said compressed vapor through a means for expanding said vapor to produce at least a portion of the energy for operating said compression step.

24. A method, as claimed in claim 23, wherein said expanded vapor is compressed prior to cooling in heat transfer relationship with said impure liquid to form a second vapor at a predetermined pressure corresponding to a predetermined temperature differential between said compressed second vapor and said impure liquid.

25. A method, as claimed in claim 24, wherein said compression of expanded vapor is achieved in a substantially adiabatic fashion.

26. A method, as claimed in claim 23, wherein said vapor expands in passing through said engine in a substantially adiabatic manner.

27. A method, as claimed in claim 23, wherein said impure liquid is water and said evaporation temperature is in the range 33°–200° F.

28. A method, as claimed in claim 23, wherein said impure liquid is evaporated to form a vapor at a temperature in the range 33° F. to 160° F.

29. A method, as claimed in claim 23, wherein at least a portion of said energy is added by driving said compression means with an external mechanical energy source.

30. A method, as claimed in claim 23, wherein said impure liquid is evaporated to form a vapor at a temperature in the range 33° F. to 211° F.

31. A method, as claimed in claim 30, wherein said vapor has a pressure below atmospheric and corresponds to the saturated vapor pressure of the liquid at the vapor temperature.

32. A method, as claimed in claim 23, wherein said condensation of vapor occurs in said evaporator and said released heat is transferred to said impure liquid in said evaporator to evaporate said liquid.

33. A method, as claimed in claim 23, wherein the ratio is in the range 5:1 to 100:1.

34. A method, as claimed in claim 33, wherein the ratio is in the range 5:1 to 50:1.

35. A method, as claimed in claim 23, wherein said vapor is compressed in a substantially adiabatic manner.

36. A method, as claimed in claim 23, including the step of diverting a fraction of said vapor prior to cooling and injecting said diverted vapor fraction directly into said impure liquid at a point upstream of said evaporator, whereby said vapor condenses and said impure liquid is heated.

37. A method, as claimed in claim 23, wherein said energy from expanding said hot gas is obtained by directing a flow of hot gas through a space separate from the space in which said vapor flows, said hot gas flow in said hot gas flow space passing through means for expanding said gas.

38. A method, as claimed in claim 37, including the steps of drawing air through said hot gas flow space for mixing with said hot gas flow therein, passing said air through means for compressing said air prior to mixing with said hot gas flow, and drivingly linking said hot gas expanding means in said hot gas flow space with said air compressing means in said hot gas flow space, whereby at least a part of the energy produced by expanding said hot gas flow is used to operate said air compressing means.

39. A method, as claimed in claim 31, wherein said hot gas flow space is annularly disposed with respect to the space in which said vapor flows.

40. A method, as claimed in claim 38, wherein said hot gas flow space is annularly disposed with respect to the space in which said vapor flows.

41. A method, as claimed in claim 38, further including the steps of admitting fuel into said hot gas flow space upstream of said hot gas expanding means and igniting said fuel, whereby said hot gas flow is produced in said space.

42. A method, as claimed in claim 41, wherein said hot gas flow space is annularly disposed with respect to the space in which said vapor flows.

43. A method, as claimed in claim 41, wherein said impure liquid is evaporated to form a vapor at a temperature in the range 33° F. to 211° F.; and wherein said condensation of vapor occurs in said evaporator and said released heat is transferred to said impure liquid in said evaporator to evaporate said liquid.

44. A method as claimed in claim 23, including the step of passing at least a portion of said hot gas flow downstream of said hot gas expanding means in heat exchange relationship with said vapor to transfer heat from said gas to said vapor.

45. A method, as claimed in claim 23, wherein said vapor temperature is below the boiling point of said liquid at ambient pressure.

* * * * *